(12) United States Patent
Ayzenfeld et al.

(10) Patent No.: US 8,751,713 B2
(45) Date of Patent: Jun. 10, 2014

(54) EXECUTING VIRTUAL FUNCTIONS USING MEMORY-BASED DATA IN A PCI EXPRESS SR-IOV AND MR-IOV ENVIRONMENT

(75) Inventors: Avraham Ayzenfeld, Tel Aviv (IL); Emmanuel Elder, Haifa (IL); Ilya Granovsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/102,098

(22) Filed: May 6, 2011

(65) Prior Publication Data

US 2012/0284448 A1 Nov. 8, 2012

(51) Int. Cl.
*G06F 13/00* (2006.01)
(52) U.S. Cl.
USPC ............................................. 710/104
(58) Field of Classification Search
USPC .................................. 710/104, 313
See application file for complete search history.

(56) References Cited

U.S. PATENT DOCUMENTS

| | | | |
|---|---|---|---|
| 2008/0147898 A1* | 6/2008 | Freimuth et al. | 710/8 |
| 2009/0248947 A1* | 10/2009 | Malwankar et al. | 710/316 |
| 2011/0029695 A1* | 2/2011 | Kishore et al. | 710/9 |
| 2011/0106981 A1* | 5/2011 | Watkins et al. | 710/9 |
| 2011/0219161 A1* | 9/2011 | Deshpande et al. | 710/305 |
| 2012/0167085 A1* | 6/2012 | Subramaniyan et al. | 718/1 |

\* cited by examiner

*Primary Examiner* — Nimesh G Patel
(74) *Attorney, Agent, or Firm* — D. Kliger I.P. Services Ltd.

(57) ABSTRACT

A method, including receiving, by an extended virtual function shell positioned on a Peripheral Component Interconnect Express (PCIe) configuration space, a virtual function call comprising a request to perform a specific computation, and identifying a physical function associated with the called virtual function, the physical function one of multiple physical functions positioned on the PCIe configuration space. One or more first data values are then retrieved from a virtual function instance stored in the memory, one or more first data values, the virtual function instance associated with the called virtual function, and one or more second data values are retrieved from the identified physical function. The specific computation is then performed using the first data values and the second data values, thereby calculating a result.

21 Claims, 4 Drawing Sheets

EXECUTING VIRTUAL FUNCTIONS USING MEMORY-BASED DATA IN A PCI EXPRESS SR-IOV AND MR-IOV ENVIRONMENT

FIELD OF THE INVENTION

The present invention relates generally to input/output (I/O) devices, and specifically to a hardware framework for executing virtual functions on a Peripheral Component Interconnect Express device operating in single root or multi root I/O virtualization environment.

BACKGROUND OF THE INVENTION

Peripheral Component Interconnect (PCI) Express is a standard for linking motherboard-mounted peripherals, and as an expansion card interface for add-in boards. Typically, PCI Express (PCIe) peripherals are auto configured via a PCI configuration space. In addition to the normal memory-mapped and I/O port spaces, each device on the PCIe bus has a configuration space.

In a PCI Express system, a root complex device typically couples a processor and memory subsystem to a PCI Express switch fabric comprising one or more switch devices. The PCIe system also includes endpoints configured to perform and/or request PCI Express transactions. Each endpoint typically comprises one or more functions, and is mapped into the configuration space as a single function in a device that may include either the single function or multiple functions.

PCI Express endpoints and legacy (i.e., PCI) endpoints typically appear within a hierarchical domain originated by the root complex. In other words, the endpoints appear in the configuration space as a tree with a root port as its head. Additionally, root complex integrated endpoints and root complex event collectors typically do not appear within one of the hierarchical domains originated by the root complex. Typically, the root complex integrated endpoints and root complex event collectors generally appear in the configuration space as peers of the root ports.

Implementing virtualization can increase the effective hardware resource utilization of a PCI-Express device (i.e., the number of applications executing on the device). This approach has been addressed in the Single Root I/O Virtualization (SR-IOV) and Sharing Specification, Revision 1.0, Sep. 11, 2007, as well as in the Multi Root I/O Virtualization (MR-IOV) and Sharing Specification, revision 1.0, May 12, 2008, from the PCI Special Interest Group (SIG), whose disclosure is incorporated herein by reference. Both the SR-IOV and MR-IOV specifications define extensions to the PCIe specification, and enable multiple system images to share PCIe hardware resources. A system image comprises computer software such as operating systems, used to execute applications or trusted services, e.g., a shared or non-shared I/O device driver.

SR-IOV and MR-IOV enable a PCIe device to appear to be multiple separate physical PCIe devices. In addition to functions, which comprise PCIe device configurations, SR-IOV and MR-IOV introduce the idea of physical functions and virtual functions, which can be used to enhance performance of the PCIe device.

Physical functions are full-featured PCIe functions (per the PCI Express® Base Specification, Revision 3.0, Oct. 24, 2010, from PCI-SIG, whose disclosure is incorporated herein by reference) that support the SR-IOV capability and are accessible either to a single root PCI manager (which can be part of a multi root system), a virtual image, or a system image. In addition to having the capability to convey data "in and out" of a PCIe device, physical functions typically have full configuration resources, thereby enabling them to configure or control the PCIe device via the physical functions.

Virtual functions are "lightweight" PCIe function that execute on a SR-IOV/MR-IOV endpoint, and are directly accessible by a system image. Each instance of a virtual function is associated with an underlying physical function and typically only has the ability to convey data in and out of the PCIe device.

The SR-IOV capability (even when part of an MR-IOV design) typically reserves 16 bits for the number of virtual functions (i.e., NumVFs located at address 0x10 in the SR-IOV capability), meaning that the total number of virtual functions can theoretically reach 65,536 (i.e., 64K).

SUMMARY OF THE INVENTION

There is provided, in accordance with an embodiment of the present invention a method, including receiving, by an extended virtual function shell positioned on a Peripheral Component Interconnect Express (PCIe) configuration space, a virtual function call comprising a request to perform a specific computation, identifying a physical function associated with the called virtual function, the physical function one of multiple physical functions positioned on the PCIe configuration space, retrieving, from a virtual function instance stored in the memory, one or more first data values, the virtual function instance associated with the called virtual function, retrieving, from the identified physical function, one or more second data values, and performing the specific computation using the first data values and the second data values, thereby calculating a result.

There is also provided, in accordance with an embodiment of the present invention an apparatus, including multiple physical functions positioned on a Peripheral Component Interconnect Express (PCIe) configuration space, a memory coupled to the PCIe configuration space, and an extended virtual function shell positioned on the PCIe configuration space and configured to receive a virtual function call comprising a request to perform a specific computation, to identify one of the physical functions associated with the specific virtual function, to retrieve, from a function instance associated with the specific virtual function and stored in the memory, one or more first data values, to retrieve, from the identified physical function, one or more second data values, and to perform the specific computation using the first data values and the second data values, thereby calculating a result.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
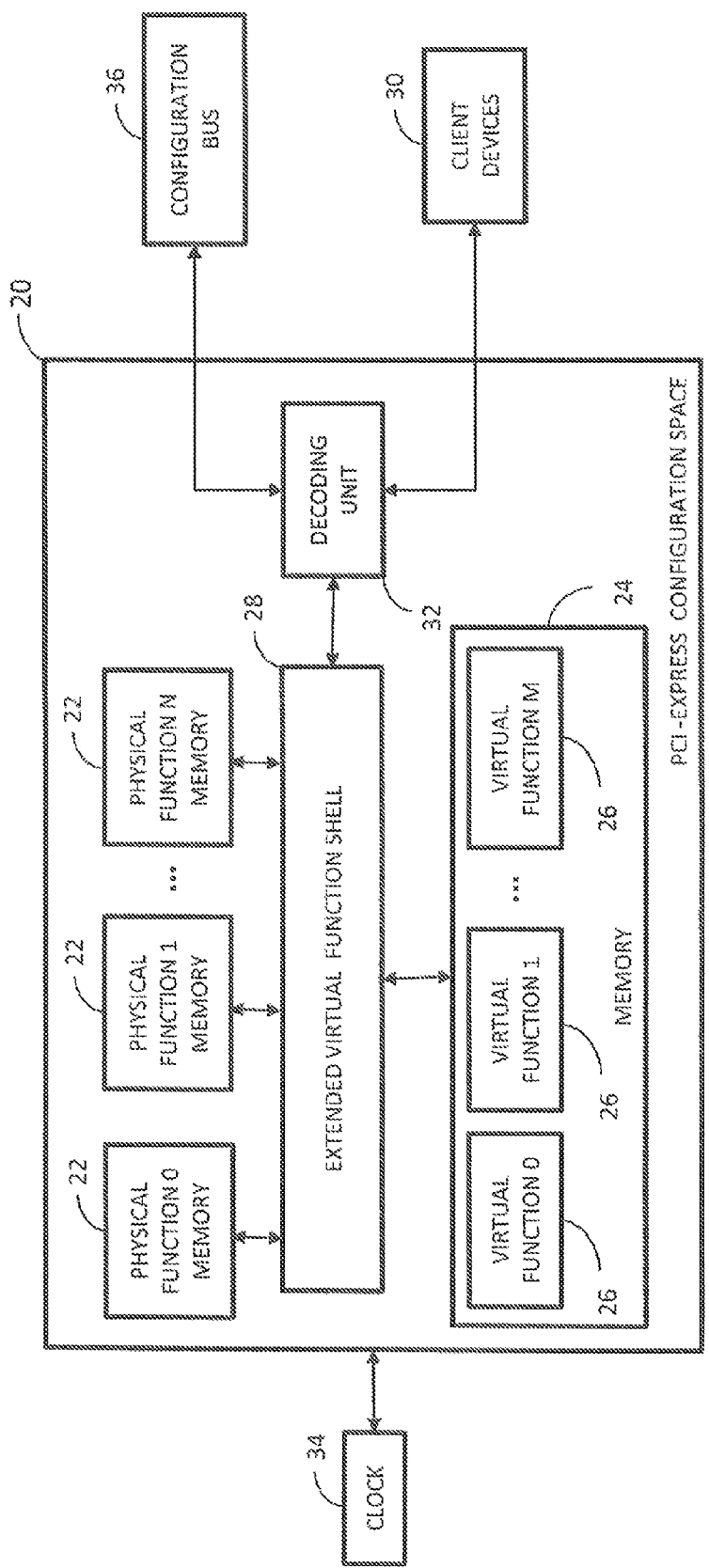
FIG. 1 is a block diagram of a PCI-Express configuration space configured to execute physical and virtual functions within a SR-IOV environment, in accordance with an embodiment of the present invention.

Embodiments of the present invention provide methods and systems for using address-based data when executing a virtual function (VF) instance in a PCIe SR-IOV/MR-IOV endpoint environment. In some embodiments, data used by the virtual function is divided into unique data and shared data. Shared data comprises data used by the virtual function that is common to a certain physical function (PF) implemented in the PCIe SR-IOV/MR-IOV environment. Unique data comprises data unique to the virtual function instance.

In some embodiments, upon receiving a virtual function call, an extended virtual function shell positioned on the PCIe configuration space retrieves shared data from a physical function positioned on the PCIe configuration space (and any unique data connected to the relevant virtual hierarchy in a MR-IOV configuration), and unique data from a memory coupled to the PCIe configuration space. The shell can then calculate a result using the retrieved shared and unique data. The result can then be either stored to the memory or conveyed to a client device coupled to the PCIe configuration space.

Embodiments of the present invention analyze the data items used by each function implemented in the PCIe configuration space. Therefore, upon receiving a virtual function call that uses a particular register (i.e., data) in a virtual function, the extended virtual function shell can first determine the type of data stored by the register, and then retrieve the actual data from structures including a physical function, a group of virtual functions, or the virtual itself. Additionally or alternatively, the shell may use a constant value for the particular register.

As the number of endpoints in SR-IOV/MR-IOV systems increase, the number of virtual functions correspondingly increases, which also increases the amount of (hardware) storage used for data, configuration space headers, capability structures and error handling. By only storing unique data in the virtual function data registers, embodiments of the present invention may significantly reduce the amount saved data, hardware logic and wiring in the SR-IOV/MR-IOV virtual functions, thereby enabling greater instances of virtual functions to execute in a PCIe configuration space.

Embodiments of the present invention help implement the growing number of physical and virtual functions (and their associated configuration registers) in SR-IOV/MR-IOV environments. Each virtual function may have be linked to multiple fields (e.g., the configuration header, capabilities and errors) and comprise multiple registers, wires and multiplexers.

Additionally, since each virtual function stores its own data (or at least a wired link to it), designing configuration spaces with multiple virtual functions is typically more complex as the number of virtual functions increases. Embodiments of the present invention help provide a hardware implemented solution for implementing the actual limits of the PCI-SIG SR-IOV/MR-IOV spec, which limits the number of combined physical functions and linked virtual functions to 64 k. Additionally, embodiments of the present invention can facilitate any additional future growth in the number of functions.

FIG. 1 is a block diagram of a PCIe configuration space 20 that is an endpoint configured to execute virtual functions in a SR-IOV environment, in accordance with an embodiment of the present invention. PCI configuration space 20 comprises multiple physical functions 22 configured to store the shared data for each of the physical functions. In the configuration shown in FIG. 1, there are N+1 physical functions 22, one for each physical function supported by configuration space 20. In some embodiments, each physical function 22 may comprise dedicated data registers, a dedicated memory array, or a combination of the two. In alternative embodiments, two or more of physical functions 22 may share a single memory array. Typically, the configuration of physical functions 22 may depend on a memory requirement for each of the physical functions.

PCIe configuration space 20 also comprises a memory 24 configured to store unique data for virtual function instance 26 currently active on configuration space 20. In the configuration shown in FIG. 1, there are M+1 instances of virtual functions 26 active on configuration space 20.

Upon receiving a virtual function call, an extended virtual function shell 28 retrieves shared data from the underlying physical function associated with the virtual function, and retrieves the unique data from the virtual function instance in memory 24 allocated to the called virtual function. Virtual function shell 28 comprises hardware logic dedicated to executing virtual function calls per the SR-IOV/MR-IOV specification by performing a specific calculation. Using the retrieved shared and unique data, virtual function shell 28 calculates a result, and stores the result to memory 24. Alternatively, virtual function 28 may convey the result to one or more client devices 30 via a decoding unit 32. Examples of client devices include, but are not limited to a transport layer, a data link layer and a physical layer.

A configuration bus 36 is coupled to decoding unit 32, and configured to enable software applications executing on a processor (not shown) coupled to configuration space 20 to read and write values to virtual functions 26 in the configuration space.

Although the design of configuration space 20 shown in FIG. 1 comprises a single virtual function shell 28, other configurations may include two or more virtual function shells 28, and are considered to be within the spirit and scope of the present invention. Additional virtual function shells 28 may further increase performance of the virtual function calculations. Additionally, performance can be increased by pipelining the execution of virtual function calls, i.e., calculating a virtual function during each cycle of a clock 34.

Figure 2:
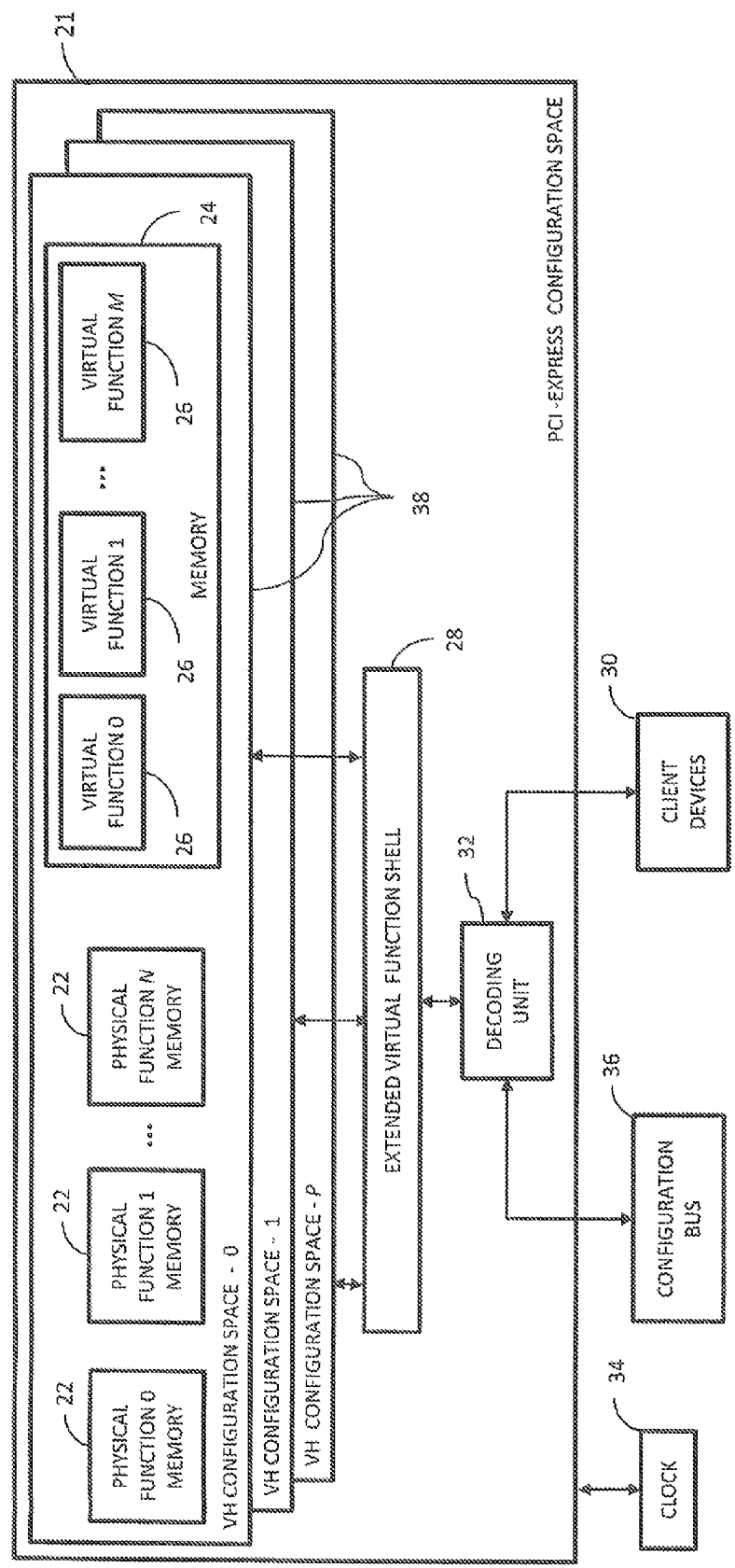
FIG. 2 is a block diagram of a PCI-Express configuration space configured to execute physical and virtual functions within several virtual hierarchies in a MR-IOV environment, in accordance with an embodiment of the present invention.

FIG. 2 is a block diagram of a PCI-Express configuration space 21 configured to execute physical and virtual functions within several virtual hierarchies in a MR-IOV environment, in accordance with an embodiment of the present invention. PCIe configuration space 21 comprises multiple virtual hierarchy (VH) configuration space 38, where each of the VH configuration spaces functions individually as a SR-IOV.

In the configuration shown in FIG. 2, there are P+1 instances of physical functions 22 and virtual functions 26 (i.e., there are P+1 instances of VH configuration space 38, where each of the VH configuration spaces may comprise different numbers of physical functions and virtual functions). Each instance of the physical and the virtual functions is positioned on one of the VH configuration spaces. While the configuration in FIG. 2 shows the VH configuration spaces coupled to a single extended virtual function shell 28, other configurations of PCIe configuration space 21 may comprise multiple extended virtual function shells 28, and are considered to be within the spirit and scope of the present invention.

Figure 3:
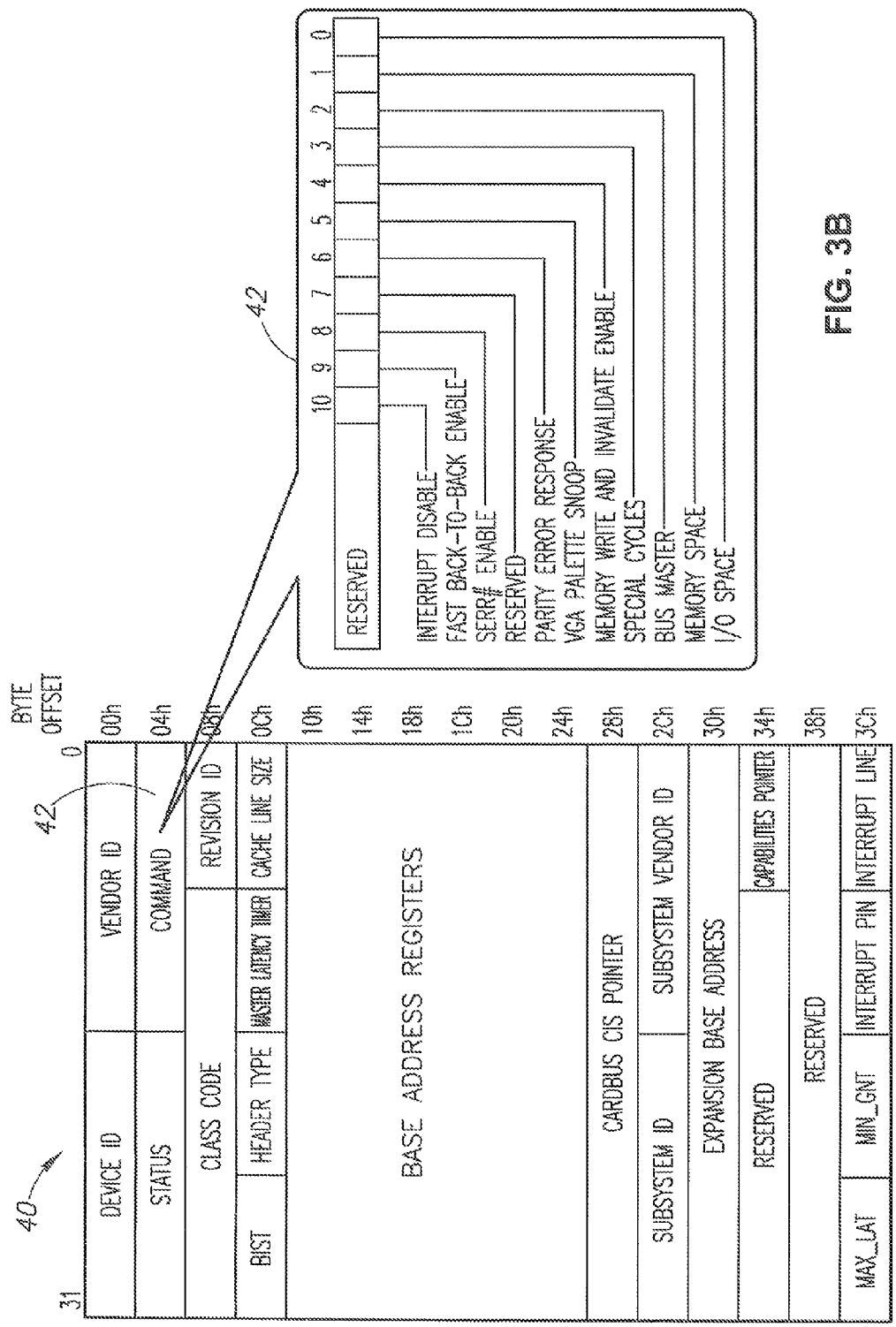
FIG. 3a is a table showing the register layout for a PCI Type 0 configuration space header, in accordance with an embodiment of the present invention.
FIG. 3B is a table showing the command register layout for the PCI Type 0 configuration space header, in accordance with an embodiment of the present invention.

FIG. 3A is a table showing the register layout for a PCI Type 0 configuration space header 40, in accordance with an embodiment of the present invention. Configuration space header 40 comprises a 16-bit command register 42 starting at the fourth byte of the header. FIG. 3B is a table detailing command register 42, in accordance with an embodiment of the present invention. The tables in FIGS. 3A and 3B are from the Single Root I/O Virtualization and Sharing Specification, Revision 1.0, Sep. 11, 2007, whose disclosure is incorporated herein by reference.

Analysis of bits 0-15 of command register 42 in the PCIe and SR-IOV specifications revealed that:
Bits 0, 1 and 10 comprise a constant value.
Bit 2 comprises a "bus master enable".
Bits 3, 5, 7 and 9 do not apply to PCIe, and are therefore "0" constants.
Bit 6 comprises a "parity error response" from a physical function.
Bit 8 comprises a "system error (SERR) enable" from a physical function.
Bits 11-15 are unused.

Embodiments of the present invention reduce the amount of required command register bits from 16 bits per function to one bit per function, plus two additional bits per physical function as follows:
Bit 2 (Bus Master Enable): Bit 2 is set according to the function (i.e., physical or virtual) and typically has one instance per each virtual and physical function.
Bit (Parity Error Enable): Bit 6 is set according to the physical function. Bit 6 is typically saved once per physical function, and therefore all linked virtual functions can retrieve bit 6 from the physical function (i.e., bit 6 will not be saved for each virtual function).
Bit 8 (SERR Enable): Similar to bit 6, bit 8 is typically saved once per physical function, and therefore all linked virtual functions can retrieve bit 6 from the physical function.
Unused bits or inapplicable bits can be rerouted to retrieve data from a zero register.

Address Based Data for Virtual Functions

Embodiments of the present invention distribute the data allocated to each function implemented in the PCIe configuration space between registers (or memory arrays, depending on the configuration) in physical functions 22 and virtual function instances 26 in memory 24. Distributing the data may reduce the memory allocated (i.e., via a memory array and/or a data register as described supra) per physical function 22 and may not require saving the entire configuration space for each function.

In embodiments of the present invention, each virtual function instance 26 typically stores only unique data (i.e., in memory 24) for the virtual function instance. Data used by functions in the endpoints of the PCIe SR-IOV/MR-IOV environment can be tiered as follows:
Data for functions.
Data for physical functions. While the physical functions can be called via the virtual functions, there may be instances where client 30 directly calls one of the physical functions.
Data for virtual functions:
Data for virtual functions associated with a physical function.
Unique data for each virtual function
Constant values for virtual functions.
Constant values for functions.

Figure 4:
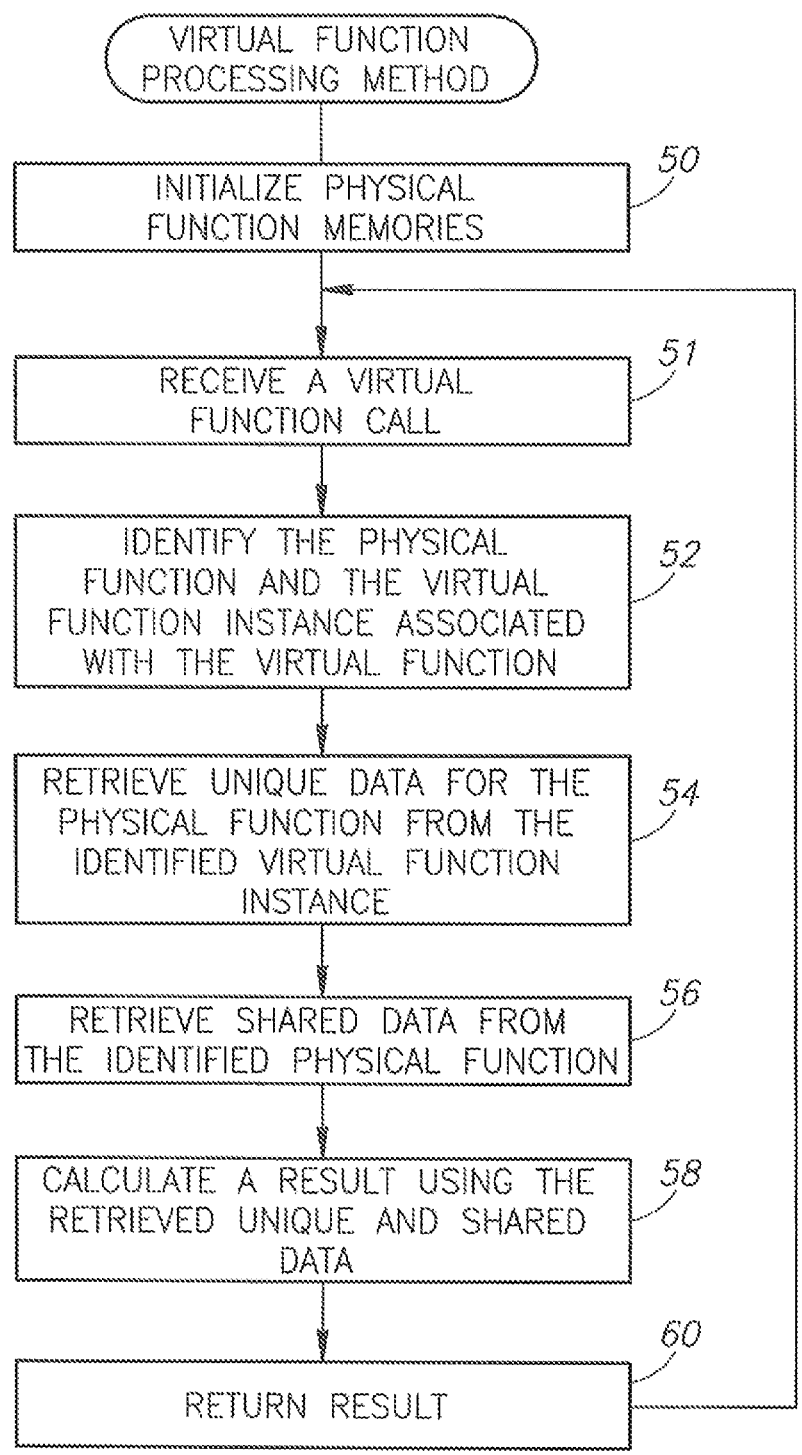
FIG. 4 is a flow diagram that schematically illustrates a method of executing a virtual function using memory-based data, in accordance with an embodiment of the present invention.

FIG. 4 is a flow diagram that schematically illustrates a method of executing a virtual function using memory-based data, in accordance with an embodiment of the present invention. In an initialization step 50, virtual function shell 28 initializes physical functions 22 with the shared data values for each of the physical functions. After virtual function shell 28 receives a virtual function call (step 51) to perform a specific computation, virtual function logic shell 28 identifies both physical function 22 and virtual function instance 26 associated with the called virtual function (step 52). While the virtual function call is typically received from client 30, the virtual function call may be a response to either an error condition (e.g., in configuration space 20 or in one of clients 30), or an action that prompts a reevaluation of the configuration space data.

Virtual function shell 28 retrieves one or more first values which are unique data values from the identified virtual function instance in memory 24 (step 54), and one or more second values which are shared data values from the identified physical function and any related virtual hierarchy in an MR-IOV configuration (step 56). Additionally, there may be instances where physical function 22 has one or more additional virtual functions associated with the physical function. For example, there may be errors that are associated with all the physical functions supported by configuration space 20. To process the one or more additional virtual functions, shell 28 may call each of the additional virtual functions using the methods described herein.

Virtual function shell 28 then performs the specific computation using the retrieved shared and unique data, thereby calculating a result (step 58). Finally, virtual function shell 28 either stores the result to either memory 24, or conveys the result to one or more of client devices 30 via decoding unit 32 (step 60), and the method continues with step 50. Additionally or alternatively, extended virtual function shell 28 may store the result an address in memory 24 for later use.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method, said method comprising:
   receiving, by an extended virtual function shell positioned on a Peripheral Component Interconnect Express (PCIe) configuration space, a virtual function call comprising an identification of a called virtual function and a request to perform a specific computation associated with the called virtual function;
   identifying a physical function associated with the called virtual function, the physical function being one of multiple physical functions implemented by the PCIe configuration space;
   retrieving, from a virtual function instance stored in a virtual function memory, one or more first data values, the virtual function instance being associated with the called virtual function;
   retrieving, from a physical function unit of the identified physical function, separate from the virtual function memory, one or more second data values;
   performing the specific computation using the first data values and the second data values, thereby calculating a result;
   identifying one or more additional virtual functions associated with the identified physical function; and
   conveying, to the extended virtual function shell, respective virtual function calls for each of the additional virtual functions.

2. The method according to claim 1, and comprising storing the result to the memory.

3. The method according to claim 1, and comprising conveying the result to one or more clients coupled to the PCIe configuration space.

4. The method according to claim 1, wherein the virtual function instance is associated uniquely with the called virtual function.

5. The method according to claim 1, wherein the one or more second values comprises shared data.

6. The method according to claim 1, wherein each of the one or more second values comprises a constant value.

7. The method according to claim 1, wherein each of the multiple physical functions comprise one or more hardware registers configured to store the second data values.

8. The method according to claim 1, wherein the extended virtual function shell comprises hardware logic configured to perform a specific calculation.

9. The method according to claim 1, wherein the PCIe configuration space comprises endpoints operating in a single root input/output virtualization environment.

10. The method according to claim 1, wherein the PCIe configuration space comprises endpoints operating in a multi root input/output virtualization environment.

11. The method according to claim 1, wherein retrieving the one or more second data values comprises retrieving a value from at lest one single bit field.

12. The method according to claim 1, wherein receiving the a virtual function call comprises receiving a request for a register of the virtual function call, and wherein the extended virtual function shell determines the type of data stored in accessed fields of the register, before retrieving the first and second data values.

13. The method according to claim 1, wherein the virtual function instances stored in the virtual function memory, include the same fields for all the virtual functions.

14. An apparatus, comprising:
   multiple physical functions positioned on a Peripheral Component Interconnect Express (PCIe) configuration space;
   a memory coupled to the PCIe configuration space; and
   an extended virtual function shell positioned on the PCIe configuration space and configured to receive a virtual function call comprising an identification of a called virtual function and a request to perform a specific computation associated with the called virtual function, to identify one of the physical functions associated with the specific virtual function, to retrieve, from a function instance associated with the specific virtual function and stored in the memory, one or more first data values, to retrieve, from a physical function unit of the identified physical function, separate from the virtual function memory, one or more second data values, and to perform the specific computation using the first data values and the second data values, thereby calculating a result,
   wherein the extended virtual function shell is configured to identify one or more additional virtual functions associated with the identified physical function, and to convey, back to the extended virtual function shell, respective virtual function calls for each of the additional virtual functions.

15. The apparatus according to claim 14, wherein the virtual function instance is associated uniquely with the called virtual function.

16. The apparatus according to claim 14, wherein the one or more second values comprises shared data.

17. The apparatus according to claim 14, wherein each of the one or more second values comprises a constant value.

18. The apparatus according to claim 14, wherein each of the multiple physical functions comprise one or more hardware registers configured to store the second data values.

19. The apparatus according to claim 14, wherein the extended virtual function shell comprises hardware logic configured to perform a specific calculation.

20. The apparatus according to claim 14, wherein the PCIe configuration space comprises an endpoint operating in a single root input/output virtualization environment.

21. The apparatus according to claim 14, wherein the PCIe configuration space comprises an endpoint operating in a multi root input/output virtualization environment.

* * * * *